Jan. 8, 1963 S. ZURY 3,071,797
CONNECTOR FOR WINDSHIELD WIPER ARM UNIT AND BLADE UNIT
Filed July 29, 1959
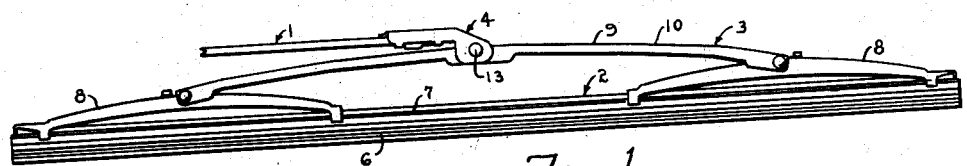
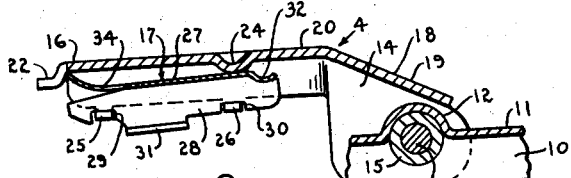
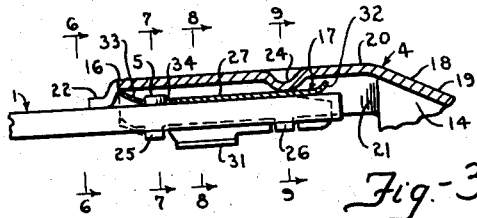
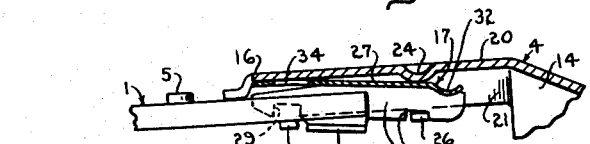
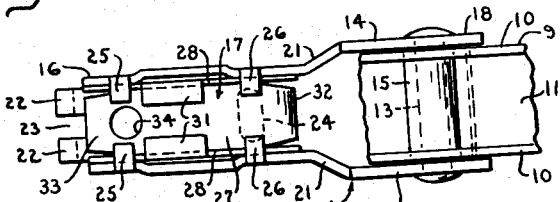
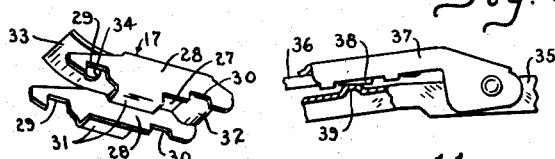
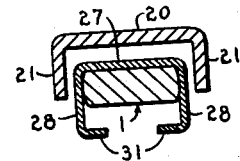
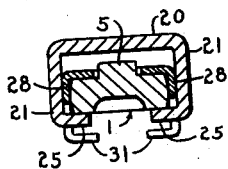
INVENTOR.
STEVE ZURY
BY W. E. Rechtenwald
Charles S. Penfield
ATTORNEYS

United States Patent Office

3,071,797
Patented Jan. 8, 1963

3,071,797
CONNECTOR FOR WINDSHIELD WIPER ARM UNIT AND BLADE UNIT
Steve Zury, Gary, Ind., assignor to The Anderson Company, a corporation of Indiana
Filed July 29, 1959, Ser. No. 830,398
14 Claims. (Cl. 15—250.32)

This invention relates generally to windshield wiper devices and more particularly is directed to a connector for establishing a connection between a wiper arm unit and a wiper blade unit.

More particularly, the connector includes a housing member having a spring device therein provided with an abutment which interlocks with an abutment provided on the wiper arm unit. The abutment on the spring device is preferably in the form of an opening and the abutment on the arm is preferably in the form of a projection or lug.

An important object of the invention is to form the spring device with a base wall and provide same with the opening above referred to, so that when the arm is inserted into the housing the device will be retracted to permit the projection on the arm to enter the opening and thereby lock the blade to the arm.

A significant object of the invention is to provide the spring device with side walls having offsets or flanges thereon which may be manually engaged to actuate the device in a manner whereby the projection on the arm may be readily released from the opening to permit separation of the blade and arm.

Another object of the invention is to provide the housing with a channel extremity in which the spring device is secured and an offset extremity which is adapted for attachment with improved pivotal connection means extending transversely through the offset extremity and a part of the blade unit.

Another object of the invention is to provide the channel extremity of the housing with a base wall and side walls provided with longitudinally spaced pairs of transverse abutments preferably in the form of inturned fingers located opposite the base wall of the spring for engaging the arm, and provide the side walls of the spring device with notches for receiving the pairs of the fingers for locking the spring device in the channel extremity.

A specific object of the invention is to provide the base wall of the channel extremity with an inturned portion or abutment constituting a fulcrum for engaging the inner extremity of the base wall of the spring, so as to normally maintain the spring in a predetermined inclined relation with respect to the base wall of the channel extremity in order that the spring may be readily tilted on the fulcrum and/or flexed when the arm is inserted into the channel extremity against the spring.

An additional object of the invention is to provide the base wall of the channel extremity with a pair of offset fingers defining an opening which serves to guide or pilot the projection on the arm into the opening in the spring and stabilize the position of the arm when it is locked in the connector.

A further object of the invention is to provide an efficient connection between the connector and wiper arm and an arrangement whereby the arm and the connector are normally held against relative rockable movement.

Also, an object of the invention is to provide improved means whereby the arm and connector may be readily separated when the spring device of the connector is forcibly brought into engagement with a bridge member of a pressure device operatively connected to the blade unit.

Other objects and advantages of the invention will become apparent after the description hereinafter set forth is considered in conjunction with the drawings annexed hereto.

In the drawings:

FIGURE 1 is an elevational view showing the connector embodying the invention as applied to a wiper arm unit and a wiper blade unit;

FIGURE 2 is an enlarged partial vertical section of the assembly in FIGURE 1 with the arm removed and portions in section to illustrate details of design and construction;

FIGURE 3 is a sectional view similar to FIGURE 2 with the arm inserted in the connector;

FIGURE 4 is a sectional view similar to FIGURE 3 showing the manner in which the arm can be readily released from the connector;

FIGURE 5 is a bottom view of the connector and a part of a pressure device to which the connector is attached;

FIGURE 6 is a transverse section taken substantially on line 6—6 of FIGURE 3;

FIGURE 7 is a transverse section taken substantially on line 7—7 of FIGURE 3;

FIGURE 8 is a transverse section taken substantially on line 8—8 of FIGURE 3;

FIGURE 9 is a transverse section taken substantially on line 9—9 of FIGURE 3;

FIGURE 10 is a perspective view of the spring device; and

FIGURE 11 is a partial side-elevational view of a modified construction showing the manner in which the arm may be readily separated from the connector by pressing the spring device against the bridge of the pressure device.

Referring to the drawings, numeral 1 generally designates a wiper arm unit, 2 a wiper blade unit, 3 a pressure device attached to the blade unit, and 4 a connector operatively connecting the pressure device and arm unit.

The arm unit 1 depicted in the drawings is preferably in the form of a bar, rectangular in cross section, and provided with an abutment 5 preferably in the form of a round projection extending at right angles to the plane of the bar at a location spaced inwardly from its end margin. The outer free extremity of the arm unit provided with the abutment constitutes an entering part for repection in the connector 4. The unit shown is adapted to be pivotally attached to a head for connection with a driven element, such as a shaft, with a spring operatively connected to the head and unit for urging the latter toward a windshield to be wiped.

The blade unit 2 preferably includes a resilient wiper element 6 and a resiliently flexible support 7 therefor, and the pressure device preferably includes a pair of secondary yokes 8 having ends connected to the blade and a bridge 9 having ends attached to the secondary yokes. The bridge is preferably of channel shape having side walls 10 provided with openings constituting seats and a base wall 11 provided with a semicylindrical raised portion or recess 12. A cross pin 13 extends through the side walls 10 and through side walls 14 of the connector for pivotally connecting the connector to the bridge. A cylindrical tubular bearing 15 is mounted on the pin for partial disposition in the recess 12 and reception in the seats provided in the side walls 10 of the bridge as exemplified in FIGURE 2 to provide a stable and efficient pivotal connection between the bridge and connector. With this setup the pivotal connection between the connector and bridge is so disposed that the connector can be located somewhat closer to the wiper blade unit and thereby reduce the over-all height of the structure.

The connector may be designed and constructed in various ways but as illustrated is preferably made in the form of an elongate housing having a relatively straight channel extremity 16 within which a spring device generally designated 17 is secured and an enlarged extremity 18 which is offset with respect to the channel extremity. The offset extremity includes the side walls 14 above referred to and a base wall 19 which overlies the pivotal connection between the connector and the bridge.

The channel extremity includes a base wall 20 and side walls 21 which respectively constitute continuations of the base wall 19 and side walls 14 of the offset extremity. The base wall 20 is provided with a pair of longitudinally extending offset fingers 22 which define an opening or slot 23 through which the abutment 5 on the arm is guided or piloted into engagement with the spring device. The base wall 20 is also provided with a fulcrum 24 which is preferably formed by indenting the wall. It will be noted that the indent extends transverse to the longitudinal axis of the housing and provides a convex surface spaced longitudinally inward from the offset fingers 22.

The side walls 21 of the channel extremity 16 are respectively provided with a pair of longitudinally spaced abutments preferably in the form of inturned fingers 25 and 26 which cooperate with the spring device for locking the latter in the extremity.

The spring device may be designed and constructed in various ways, but as exemplified herein includes a base wall having an intermediate planar portion 27, a pair of side walls 28 respectively provided with a pair of longitudinally spaced abutments preferably in the form of notches 29 and 30, and a pair of offsets or inturned flanges 31 carried by and constituting continuations of the side walls. The inner end of the base wall is preferably provided with a normally inturned curved portion 32 and its outer end with a normally outturned curved portion 33. An abutment preferably in the form of an opening 34 is provided in the base wall at the junction between the planar portion 27 and the curved outer portion 33. These curved portions are independently flexible and when the spring device is secured in a nested position in the channel extremity 16 of the housing by the pairs of fingers 25 and 26, which respectively extend into the pairs of notches 29 and 30 in overlying relationship to the device, the base wall adjacent the inner curved portion 32 will be caused to bear against the fulcrum 24, the free end of the curved portion 33 against the base wall 20 of the channel extremity and the offset fingers 22 in a manner to locate the spring device in an inclined position for tilting or rocking as evidenced in FIGURE 2. In other words, the fulcrum 24 and outer curved portion 33 of the spring device serve to normally maintain the base wall or intermediate planar portion 27 thereof in a predetermined spaced angular relationship to the base wall of the channel extremity so that when the arm is first introduced into the connector the spring device will be caused to tilt about the fulcrum 24 and when inserted to the full extent, as shown in FIGURE 3, the device will assume a position substantially parallel to the base wall of the channel extremity. If found desirable, the base wall of the spring device could be provided with a fulcrum in lieu of providing the fulcrum on the base wall of the connector housing as shown. The spring device may be referred to as being channel-like or cage-like in shape.

The arrangement described above is such that the outturned curved portion 33 of the device is flexed or directed toward the bottom wall of the channel extremity 16 when the arm end is first introduced into the spring device, extremity between the offset fingers 22 and the adjacent fingers 25, and as inward movement of the arm is continued the projection 5 on the arm will pass through the slot or opening 23 defined by the offset fingers 22 and then ride onto and retract the curved portion 33 including the planar portion 27 farther toward the base wall of the channel extremity until the projection snaps into the opening 34, as depicted in FIGURE 3, to positively lock the arm and connector together.

The opening 34 is so located that when the arm is being inserted into the connector the projection 5 on the arm will gradually deflect the curved portion 33 including the planar portion 27 to gradually present the opening for receiving the projection. It should be noted that as the projection approaches the opening the tip of the arm engages and deflects the inner curved portion 32 of the spring device and that when the arm is locked in place the base wall of the device, including the curved portions 32 and 33, serves to urge the arm toward the pairs of fingers 25 and 26 and dampen vibration between the arm and connector. The curved portion 32 is so located that when it is engaged by the tip of the arm the spring device is caused to tilt to some extent and thereby cause the rear end of the device to forcibly bear against the arm and effect a positive connection between the projection 5 and the opening 34. More particularly in this regard, the space between the fingers 26 and the fulcrum 24 is predetermined, and the same is true of the space between the fingers 22 and 25 so that the arm will snugly fit in the connector and thereby substantially prevent rockable movement therebetween when the blade is oscillated on the windshield. It will also be noted that the side walls of the channel extremity are widened between the fingers 25 and 26 so as to reduce friction between these side walls and the side walls of the spring device and thereby allow the device to readily adjust itself to the arm. The space between the portions of the side walls of the channel extremity from which the fingers 25 and 26 project is less than the space between the widened portions and is predetermined so that the arm is snugly received at longitudinally spaced locations to substantially prevent relative lateral movement between the arm and connector.

The arm can be readily released from the connector by merely depressing the opposed flange portions 31 toward the base wall of the channel extremity to retract or tilt the spring device sufficiently to free the opening 34 from the projection, whereupon the arm can be withdrawn, as shown in FIGURE 4. It will be noted that the notches 29 in the spring device are of a sufficient depth to slidably receive the fingers 25 on the side walls of the channel extremity when the device is tilted relative to the extremity.

In the modified structure exemplified in FIGURE 11 of the drawing, numeral 35 represents a bridge of a pressure device carried by a wiper blade, numeral 36 a wiper arm and numeral 37 a connector carried by the bridge for establishing a detachable connection between the arm and bridge. The connector 37 substantially corresponds to the connector described above and includes a spring device having flanges 38 for retracting the spring device to permit separation of the arm from the connector.

The bridge 35 is provided with an outwardly extending transverse abutment 39 located opposite the flanges 38 so that when the abutment 39 and flanges 38 are brought into engagement with sufficient force to retract the spring device to disengage the projection on the arm from the opening in the spring device, the arm can be withdrawn from the connector. In other words, the structure is provided with means adjacent the pivotal connection between the connector and pressure device for retracting the spring device when the inner end of the blade is moved a predetermined distance toward the arm. It should be noted that the pivoting required to effect the retraction is beyond that which normally occurs when the blade is in operation. The engagement of the abutment with the flanges to effect a release of the arm from the connector can be accomplished by first moving the arm and blade away from a windshield and then varying the angular relationship between the longitudinal axes of the arm and blade to cause such engagement or the abutment and flanges can be brought into engagement by pressing them together while the blade is in bearing relationship with the windshield. The arm can also be forced toward the blade by applying pressure against the connector to effect engagement between the flanges and abutment sufficiently to permit removal of the arm while the blade is bearing against the windshield. The modified structure thus provides a unique setup whereby the arm and blade can be readily separated without manually engaging the flanges. It is to be understood that, if found desirable, the flanges on the spring device could be extended outwardly a greater extent than that shown in lieu of providing the abutment on the bridge, in which event the flanges would engage a smooth exterior outer surface of the bridge to effect a retraction of the device to permit withdrawal of the arm from the connector.

Having thus described my invention, it is obvious that various other modifications may be made in the same without departing from the spirit of my invention; hence, I do not wish to be understood as limiting myself to the exact forms, constructions, arrangements and combinations of parts herein shown and described or uses mentioned.

I claim:

1. A connector of the kind described comprising an elongate housing having a front wall provided with a fulcrum, a channel-like spring device secured in the housing and engaging the fulcrum for tilting movement, and an abutment provided on the spring device, said abutment being so disposed that when an entering part having an abutment thereon is inserted into the housing and the spring device the latter will be tilted to cause a portion thereof between said front wall and part to react and thereby enable the abutments to engage and thereby lock the part in the housing.

2. A connector of the kind described comprising an elongate housing provided with an entrance opening, a channel-like spring device secured in the housing, said housing having a front wall provided with a fulcrum engaged by the spring device to support the latter for tilting movement, and an abutment provided on the spring device, said abutment being so disposed that when an entering part having an abutment thereon is inserted into the housing through the entrance opening and into the spring device the latter will be tilted to cause a portion thereof between said front wall and part to react and thereby enable the abutments to engage and thereby lock the part in the housing.

3. A connector of the kind described comprising an elongate housing and a cage-like spring device disposed in the housing, said housing having a front wall provided with a fulcrum, means provided on the housing and means provided on the spring device for locking the device in the housing with the device engaging the fulcrum in a manner to enable the device to tilt on the fulcrum when an entering part having an abutment thereon is inserted into the housing and device, and said device having a portion provided with an abutment for engagement with the abutment on the entering part at a location between said part and said front wall for locking the entering part in the housing.

4. A connector of the kind described comprising an elongate housing having an end adapted for attachment to a wiper and a channel for receiving an entering part provided with an abutment, said channel including a base wall provided with a fulcrum, an elongate cage-like spring wall provided with a fulcrum, an elongate cage-like spring secured in the channel and provided with an end portion engaging the base wall and a portion spaced longitudinally from the end portion engaging said fulcrum for supporting an intermediate portion of the spring in spaced relation to said wall, and an abutment provided on the intermediate portion of the spring, the arrangement being such that when an entering part having an abutment thereon is inserted into the spring the spring will be deflected to enable the abutments to engage and thereby connect the arm and connector.

5. A connector of the kind described comprising an elongate housing having an end adapted for attachment to a wiper and a channel for receiving an entering part provided with an abutment, said channel comprising a base wall and a pair of side walls provided with inturned fingers, an elongate spring disposed in the channel and comprising a yieldable base wall and a pair of side walls provided with notches receiving said fingers for locking the spring in the channel, and said yieldable base wall being provided with an abutment, the arrangement being such that when an entering part having an abutment thereon is inserted into the connector the base wall of the spring will yield and enable the abutments to engage and thereby connect the arm and connector.

6. The connector defined in claim 5, including means provided on the side walls of the spring whereby the yieldable wall of the spring can be deflected to disengage the abutments and thereby effect a separation of the entering part and connector.

7. An elongate spring device for use with a connector housing for establishing a detachable connection between a windshield wiper arm part provided with an abutment and a wiper blade unit, said spring device being generally in the form of an open-ended channel having a yieldable base wall provided with an abutment for detachable engagement with the abutment on the arm part, and a pair of substantially parallel side walls provided with continuations which may be manually engaged to retract said yieldable wall to effect a disengagement of the abutments.

8. A connector of the kind described comprising an elongate housing provided with an entrance opening for receiving an entering part having an abutment thereon, and an elongate spring device secured in the housing and having a base wall provided with an abutment adapted for interlocking engagement with the abutment on the entering part when the latter is inserted into the entrance opening, said spring device also having a pair of side walls provided with continuations for manipulating the device to permit disengagement of said abutments.

9. A connector of the kind described comprising an elongate housing provided with an entrance opening for receiving an entering part having an abutment thereon, said housing including a base wall and side walls, a cage-like spring device disposed in the housing against the base wall and provided with an abutment for engaging the abutment on the entering part when the latter is inserted into the entrance opening and device, fulcrum means on said base wall, means on the side walls for securing the spring device in the housing against the fulcrum means in a manner to permit the spring device to tilt, and means provided on the spring device which when engaged by the entering part assists in tilting the spring device to force the abutment thereon into connection with the abutment on the entering part.

10. A connector of the kind described comprising an elongate housing provided with an entrance opening for receiving an entering part having an abutment thereon, said housing including a base wall and a pair of side walls, and an elongate spring device secured in the housing and having a bottom wall bearing against the base wall, said bottom wall being provided with an abutment for engaging the abutment on the entering part when the latter is inserted into the entrance opening, said spring also having a pair of side walls integral with and extending outwardly from said bottom wall, said side walls being provided with inturned continuations for manipulating the device in a manner whereby the abutments may be disengaged.

11. In combination: a wiper blade, a pressure device operatively connected to the blade, a connector housing pivotally connected to the pressure device and provided with an entrance opening, a wiper arm disposed in the entrance opening and having an abutment thereon, a retractible spring device secured to the connector housing and provided with an abutment cooperating with the abutment on the arm for securing the arm to the connector housing, and means located on one of said devices for engaging the other device to retract the spring device to permit release of the arm when the connector housing and pressure device are pivoted relative to one another a predetermined extent.

12. In combination: a wiper blade, a pressure device operatively connected to the blade and provided with abutment means, a connector housing pivotally connected to the pressure device and provided with an entrance opening, a wiper arm disposed in the entrance opening and having an abutment thereon, a retractible spring device secured in the connector housing and provided with an abutment engaging the abutment on the arm for locking the arm to the connector, and said spring device also being provided with means for engaging the abutment means to retract the spring device to disengage the abutments to permit the arm to be withdrawn from the entrance opening.

13. In combination: a windshield wiper arm unit, a wiper blade unit having an inner extremity and an outer extremity, a connector connected to one of said units and pivotally connected to the other unit at a location between said extremities, said connector being provided with latch means for releasably connecting said connector with said one unit, the arrangment being such that when the blade unit is pivoted to bring its inner extremity into an acute angular relationship with the arm unit said latch means will be engaged and actuated by one of said units to permit release of said connector from said one unit.

14. In combination: a windshield wiper arm unit, an elongate wiper blade assembly, a connector connected to the arm unit and pivotally connected to said blade assembly between its extremities, said connector being provided with latch means for releasably connecting said connector with said arm unit, the arrangement being such that when the blade assembly is pivoted sufficiently relative to the arm unit, a portion thereof will engage and actuate said latch means in a manner whereby said connector may be released from said arm unit.

References Cited in the file of this patent
UNITED STATES PATENTS

| | | |
|---|---|---|
| 2,751,620 | Ehrlich | June 26, 1956 |
| 2,915,770 | Scinta | Dec. 8, 1959 |

FOREIGN PATENTS

| | | |
|---|---|---|
| 813,090 | Great Britain | May 6, 1959 |